ROLL CALL ACKNOWLEDGMENT OF DATA STATIONS ON MULTISTATION LINES

Filed July 7, 1967

INVENTORS D. E. CARLSON
E. R. ROBINSON

BY R C Lipton

ATTORNEY 3,427,587

ROLL CALL ACKNOWLEDGMENT OF DATA STATIONS ON MULTISTATION LINES

David E. Carlson, Holmdel, and Edgar R. Robinson, Middletown, N.J., assignors to Bell Telephone Laboratories, Incorporated, Murray Hill, N.J., a corporation of New York Filed July 7, 1967, Ser. No. 651,913
U.S. Cl. 340—147 4 Claims
Int. Cl. H04l *1/10;* H04q *5/00*

ABSTRACT OF THE DISCLOSURE

A data message is distributed to party line station recorders which are designated by call-in codes in the message heading. A master controller monitors the message heading and after the message text has been delivered provides a roll call of the designated stations which respond by indicating whether the recorder operated properly, thus providing assurance that the contents of the complete message text was recorded.

BACKGROUND OF THE INVENTION

*Field of the invention*

This invention relates to multistation line data receiver selection systems and, more particularly, to the supervision of the distribution of data messages to data stations on multistation lines.

*Description of the prior art*

In data message distribution systems, a significant proportion of the data messages comprise only tens of words and therefore require a relatively short time interval for transmission. Each individual receiving station is therefore idle most of the time. It is thus advantageous to connect groups of data stations to a common party or multistation line. One example of such a data distribution system involves a master station which controls the distribution of the messages to selected ones of the data stations. The master station is arranged to transmit the data messages to the multistation line. Each data message includes a message heading containing call-in codes designating the addressee data stations. These codes selectively unblind the recorders at the destination stations permitting the printing of the subsequent message text.

In party line distribution systems, it is important to provide assurance that the message is delivered to the addressee stations. In prior systems, assurance is provided that each destination station recorder is unblinded to record the message by arranging the addressee station to return an answerback response when the call-in code is received. The master station is thus advised that the party line station has detected the call-in code and that the recorder thereat is prepared to receive the data message. This provision, however, does not provide assurance that the addressee station records the contents of the entire data message.

SUMMARY OF THE INVENTION

The object of this invention is to provide assurance that addressee stations on a party line record the contents of the entire data message.

This invention contemplates a new master station or controller for the multistation line together with party line stations arranged to be selected by call-in codes which, when received, unblind the data recorders at the selected stations. The outlying stations also provide answerback responses to selected roll call codes which are transmitted by the master controller after the delivery of the message text. Each addressee station indicates in its response whether or not the recorder operated properly during message delivery thus advising the master controller whether the contents of the data message were recorded.

It is a feature of this invention that the master controller monitors the message, detects the call-in codes in the message heading and lists the identity of each party line station designated by the call-in codes. Thereafter, when the delivery of the message text is completed, as indicated by the transmission of an end-of-text code, the master controller generates and transmits a roll call code corresponding to each party line station identified in the listing. Each party line station is therefore called to acknowledge the receipt of the complete message text.

It is another feature of this invention that the master controller detects each answerback response and theretafter generates and transmits the roll call code of the next addressee station. In addition, the master controller examines the answerback response, eliminating the station identity from the list if the response indicates that the message text was properly recorded. Finally, after the roll call codes are sent to all addressee stations and the responses are detected and examined, the remaining station identities, if any, on the listing are read out to determine the stations which did not acknowledge proper reception of the message text.

The foregoing and other objects and features of this invention will be fully understood from the following description of an illustrative embodiment taken in conjunction with the accompanying drawing.

BRIEF DESCRIPTION OF THE DRAWING

The drawing comprises FIG. 1 and FIG. 2 which, when arranged side by side, disclose in schematic block form a multistation line data receiver selection system wherein.

DETAILED DESCRIPTION

Figure 1:
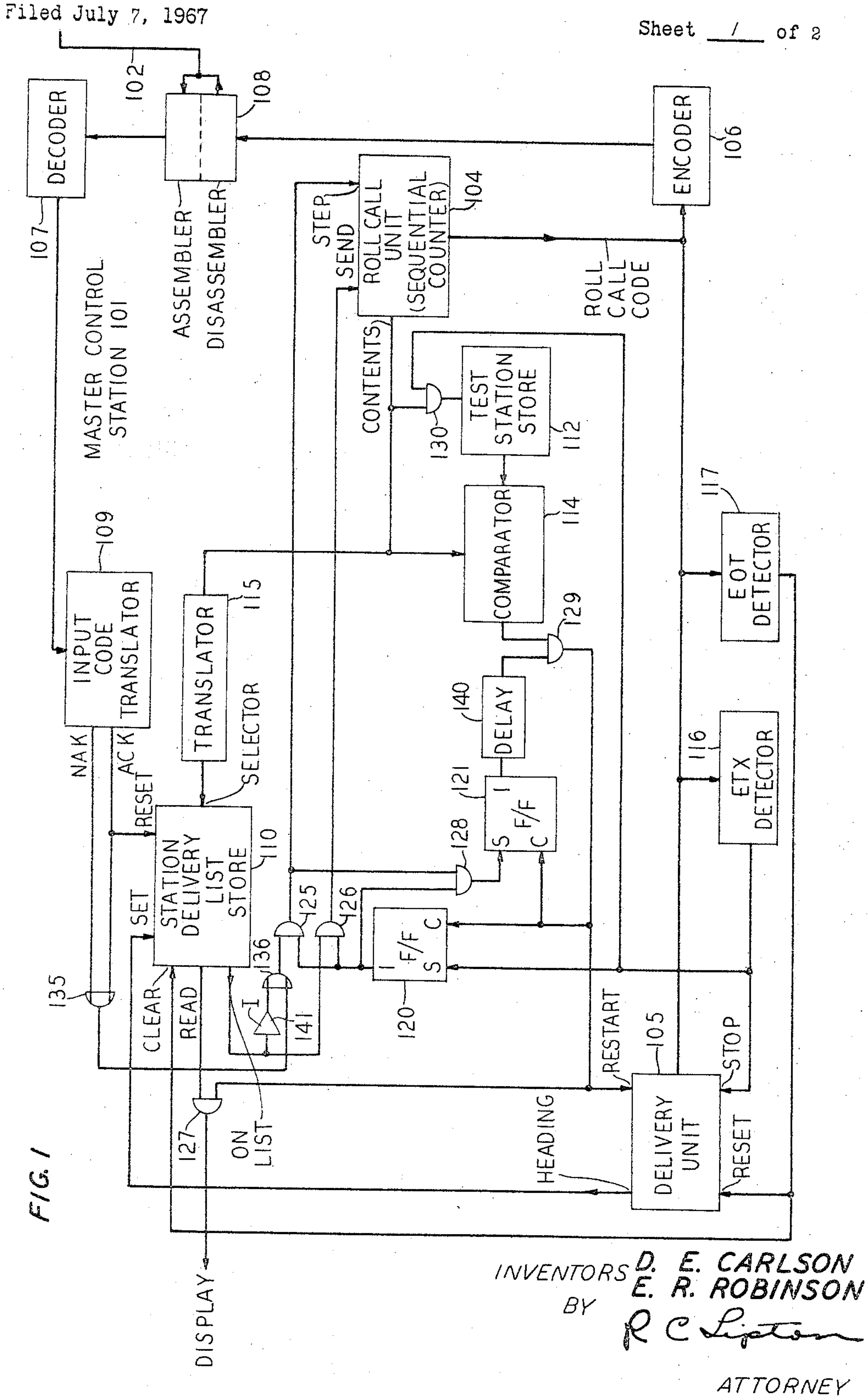
FIG. 1 shows a master controller for controlling delivery of data messages in accordance with this invention and FIG. 2 shows the party line data stations.

Referring now to the drawing, the master station is generally identified in FIG. 1 as master control station 101. Extending from master control station 101 is a data transmission line shown as line 102. In this disclosure transmission line 102 is shown as a single metallic lead which is capable of alternately conveying data from station 101 to a multistation line and applying data to control station 101 from the multistation line. Transmission line 102 may also comprise other forms of communication media such as lead pairs and carrier facilities with an appropriate employment of data sets. Transmission line 102 extends to a plurality of remote line stations such as line station 201 and line station 202 in FIG. 2.

In general, control station 101 functions to control the delivery of data messages from the control station to the several remote line stations. Each of the messages includes a message heading which contains the address codes of the destination stations and the message text. When an outgoing message becomes available at master control station 101, the message heading with the station address codes is transmitted to the multistation line. The address codes are monitored by the line stations to selectively unblind the stations of address. Concurrently with the transmitting of the address codes, a list of the addressee stations is stored at master control station 101. Thereafter, the message text is delivered to the unblinded stations. At the conclusion of the message, master control station 101 scans the stored list and sequentially calls each destination station identified on the list. Each addressee line station responds to its roll call code by returning a data character indicating whether the message was properly received. This response is detected by master control station 101 to confirm the delivery of the message to the particular station.

Considering now the sequential functions of control station 101, when a message becomes available, control station 101 proceeds to transmit the start-of-heading code and the following several address codes in the message heading. Concurrently with the transmission of each address code, the identity of the addressee station is supplied to a storage circuit whereby a list of address stations is stored at master control station 101. At the conclusion of the transmission of the address codes the start-of-text code is sent to terminate the message heading. Thereafter the message text is transmitted to the multistation line.

At each of the outlying stations, the start-of-heading code is detected, and the outlying station is alerted to look for its specific address code. In the event its address code is transmitted by master control station 101, the line station selects the station recorder. Thereafter, when the start-of-text code is received, the selected recorder is unblinded causing it to print the subsequent message text. At the same time, during the message reception, the station is preferably arranged to determine whether or not the recorder accepts a character each time a data character is received from the line. A record is thus kept whether the message is properly received. At stations not designated to receive the message, the recorder thereat remains unselected and upon the reception of the start-of-text code the station restores and stops looking for its address code.

Back at master control station 101, the message text transmission is terminated by the end-of-text code. Master control station 101 thereupon starts to scan the addressee list. As each stored identity is read, master control station 101 sends out the roll call code corresponding to the addressee station, stopping to await a response from the called outlying station. It is noted that the roll call code may be identical to the address code. This code, however, is recognized by the outlying stations as a roll call code as described hereinafter.

At each of the addressee stations, the reception of the end-of-text code blinds the station recorder and arranges the station to look for its roll call code. Upon the reception of the roll call code individual to the line station, an affirmative response is returned in the event that the message was properly received and a negative response is returned in the event that the recorder failed to accept one or more characters.

At master control station 101, the reception of the line stations' responses are decoded. If the response is affirmative, the line station identity is removed from the list. In the event, however, the response indicates improper message reception, the station identity is retained in the list. In either event, master control station 101 then proceeds with the roll call by resuming the scanning to locate the next addressee station on the list.

At the conclusion of the roll call, the stations on the list not eliminated by affirmative responses are read out. This readout may enable the display of the identities of the stations which did not properly receive the message. Other provisions may also be included, such as interception of the message and retransmission to the addressee stations who remain on the list, as is well known in the art.

At this time with the roll call concluded, the concluding portion of the message is transmitted which concluding portion also includes the end-of-transmission character. The reception of the end-of-transmission character by the address stations restores these stations to their initial conditions. At master control station 101, upon the transmission of the end-of-transmission character, the station list is cleared and master control station 101 restores to the initial condition awaiting the availability of the next message.

Roll call unit 104 in master station 101 provides the roll call codes. Roll call unit 104 comprises a conventional code generating unit having a plurality of sequential positions. When roll call unit 104 is at each of the sequential positions, it presents a roll call code corresponding to each position to output lead CONTENTS. When energized by way of input lead STEP, roll call unit 104 is enabled to advance to the next successive position to thereby present the next roll call code in the sequence to output lead CONTENTS. The roll call codes are also concurrently gated to output lead ROLL CALL CODE and thence to encoder 106 when input lead SEND is pulsed. It is noted that, although lead CONTENTS and lead ROLL CALL CODE are each shown as single output leads, they may individually comprise a plurality of leads to convey the several elements of the output code in parallel. Accordingly, these output leads may be considered groups of parallel leads, each lead in the group arranged to convey an element of the data code.

Encoder 106 accepts the data element at its input and applies them to the disassembler portion of assembler/disassembler 108. The disassembler portion, in turn, accepts the parallel code elements and shifts the elements out serially to line 102 a character at a time. It is noted that the disassembler portion may be arranged to concurrently accept two or more characters.

The assembler portion of assembler/disassembler 108 accepts the incoming serial code elements from line 102 and applies them in parallel to decoder 107. Decoder 107, in turn, passes the code elements out in parallel a character at a time to input code translator 109.

Input code translator 109 accepts the data code from decoder 107 and pulses the several output leads in accordance with the data code applied thereto. When the affirmative response code from an outlying station is applied to input code translator 109, output lead ACK is pulsed. Alternatively, when an outlying station responds with the code indicating that the message has not been properly received, input code translator 109 pulses output lead NAK.

The delivery of messages is provided by delivery unit 105. Delivery unit 105 includes a data source or transmitter which may comprise, for example, a teletypewriter or a magnetic drum. When a message is supplied to delivery unit 105, the message heading and text is delivered to encoder 106. Upon the transmission of the start-of-heading code, delivery unit 105 is arranged to read each address code in the message heading and supply the corresponding identity of the addressee station to lead HEADING. It is noted that, although a single lead is shown, the lead HEADING preferably comprises a plurality of leads, each of the leads corresponding to an associated one of the line stations. Accordingly, delivery unit 105 includes a translator which energizes a selected one of leads HEADING in response to the scanning of each address code. Thereafter, when an enabling signal is provided to delivery unit 105 by way of input lead STOP, which signal is applied at the conclusion of the transmission of the message text, message transmission by delivery unit 105 is terminated. Thereafter, upon the application of a pulse to input lead RESTART, delivery unit 105 proceeds to send the terminal portion of the message. When input lead RESET is enabled, delivery unit 105 terminates transmission and is rendered available to accept the next message.

The list of the addressee stations is stored by station delivery list store 110. Preferably, storage is provided by a plurality of memory cells, each cell individual to an outlying station. A memory cell, in turn, may constitute a conventional flip-flop circuit. The storage of a station identity is provided by input lead SET which preferably comprises a plurality of leads extending to output lead HEADING of delivery unit 105. Each one of the SET leads is connected to an associated memory cell in store 110 and the pulsing of the lead inserts a bit in the cell. Accordingly, when a selected one of the HEADING leads is pulsed to designate an address station as previously described a pulse is passed to a corresponding one of the input SET leads which, in turn, passes a pulse to the memory cell of the corresponding outlying station whereby the cell lists the station identity.

The deletion of a station identity from the list is provided by input lead RESET in accordance with the conditions of input lead SELECTOR. As described hereinafter, input lead SELECTOR may comprise a plurality of leads, each lead individually associated with an outlying station. When a pulse is provided to input lead RESET, the energized one of the SELECTOR leads directs the input pulse to the memory cell of the corresponding outlying station thereby restoring the cell to the initial condition and thus eliminating the listing of the station identity. Output lead READ preferably comprises a plurality of output leads, each lead extending to a corresponding one of the memory cells in station delivery list store 110. These leads extend to gate 127 which preferably represents a plurality of AND gates, one AND gate for each of the READ leads. Accordingly, as each station identity is stored, a corresponding one of AND gates 127 is enabled.

Input lead CLEAR extends to each of the memory cells in list store 110. The pulsing of input lead CLEAR functions to restore all of the memory cells to their initial condition clearing out any list which may be stored therein. Output lead ON LIST extends to the outputs of the various memory cells in accordance with the conditions of input lead SELECTOR. In accordance therewith the energized one of the SELECTOR leads steers the output of the memory cell individual to the SELECTOR lead to output lead ON LIST enabling the output lead when the memory cell has a list stored therein by being in the set condition.

Master control station 101 also includes test station store 112 whcih can accept a roll call code at its input, store the code until the application of a new code and apply the code elements to the output and then to comparator 114. Comparator 114 compares the stored code in store 112 with the roll call code on output lead CONTENTS of roll call unit 104, passing an enabling signal to gate 129 when these codes are identical.

Output lead CONTENTS also extends to translator 115. The function of translator 115 is to examine the roll call code on lead CONTENTS and to energize a selected one of output leads SELECTOR whereby a specific CONTENTS lead is energized corresponding to the outlying station identified by the roll call code. Also included in master control station 101 are ETX detector 116 and EOT detector 117. ETX detector 16 and EOT detector 117 function to detect the end-of-text code and the end-of-transmission code, respectively, and in response thereto pass an enabling signal to the respective outputs. Another component of master control station 101 is delay unit 140 which provides the delay corresponding to the interval of time required by roll call unit 104 to advance a step, for reasons described hereinafter. Flip-flops 120 and 121 are also provided in master control station 101. In addition, a plurality of gates are utilized such as AND gates 125–130 and OR gates 135 and 136. Finally, master control station 101 has included therein inverter 141 which functions to accept a signal at its input and applies the inversion thereof to the output.

Figure 2:
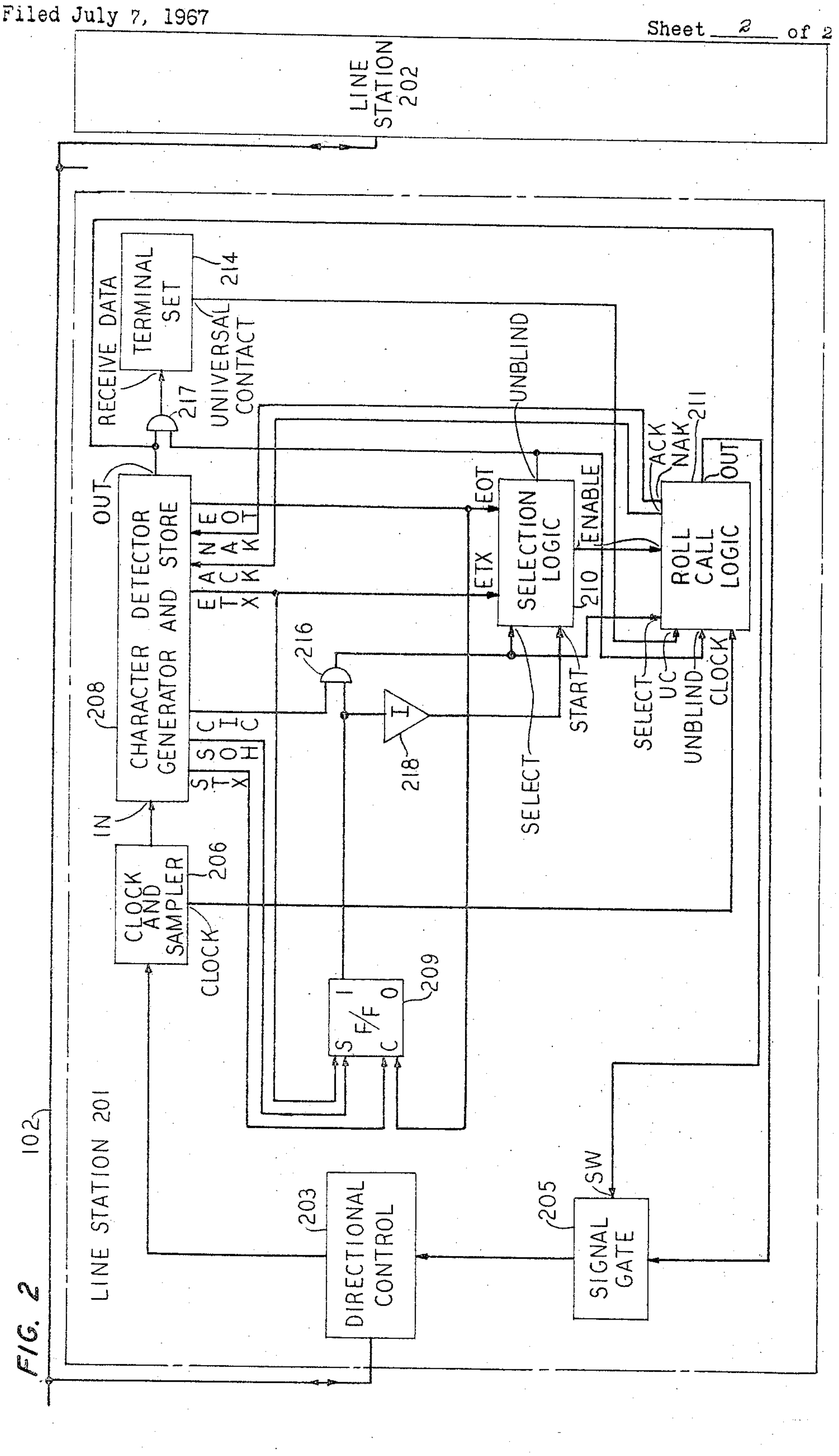

Each of the line stations, such as line station 201 and line station 202 in FIG. 2, is arranged in substantially the same manner. Each line station contains a terminal set, such as set 214 indicated in line station 201. Terminal set 214 comprises a data sink for accepting data from input lead RECEIVE DATA and recording such data. A suitable arrangement for recording data may comprise a teletypewriter which is arranged to print on a record sheet. In addition, terminal set 214 includes an output lead UNIVERSAL CONTACT, which lead is pulsed each time a data character is received on input lead RECEIVE DATA and the universal contact of the teletypewriter is thereby closed in response to the reception of the character.

Line station 201 also includes directional control 203 and signal gate 205. Directional control 203 functions to accept data from transmission line 102 and apply the data to clock and sampler 206. Data applied to directional control 203 by signal gate 205 is passed to data transmission line 102. Signal gate 205 comprises a conventional transmission gate which will pass data signals to directional control 203 when input terminal SW is energized.

Line station 201 also includes character detector generator and store 208. This store is arranged to accept serial data at terminal "in" and pass serial data to terminal "out." In addition, store 208 responds to the application of a pulse from either of input leads NAK or ACK to generate a predetermined data character for application to terminal "out." In addition, store 208 pulses output leads STX, SOH, CIC, ETX, and EOT when specific codes are stored therein. Preferably character detector and generator store 208 comprises a shift register having a sufficient number of stages for storing the elements of at least one data character. In addition, store 208 preferably includes input networks for coding the several stages with elements of a predetermined data character in response to the pulsing of each of the input leads. Store 208 also preferably includes output networks for pulsing a selected one of the output leads when the several stages are storing predetermined code elements which make up a selected code character.

Line station 201 also includes logic units identified as selection logic 210 and roll call logic 211. These units include flip-flops and gates and assume various states or conditions and provide various output signals in response to various permutations of input signals as described hereinafter. Finally, line station 201 includes flip-flop 209, AND gates 216 and 217 and inverter 218.

Assume now that the system is in the initial idle condition. The delivery of a message to delivery unit 105 initiates the message delivery state. It is assumed that this message may be delivered to delivery unit 105 in any well known manner, such as the delivery of a message tape to the teletypewriter in delivery unit 105. With the message delivered, delivery unit 105 scans message heading, sending first the start-of-heading code character to encoder 106 followed by each address code identifying each destination station. Encoder 106 passes the start-of-heading character and the address codes to the disassembler portion of assembler/disassembler 108 whereby the code characters are serially passed to data transmission line 102.

Upon the reading of the start-of-heading character, delivery unit 105 is enabled to examine each subsequent address code. Upon the examination of each address code, a selected one of output leads HEADING is energized, energizing in turn input lead SET of station delivery list store 110. Consequently, as each address code is scanned by delivery unit 105, a bit is inserted in each memory cell in station delivery list store 110 corresponding to each destination station. Accordingly, the start-of-heading character and the address codes are transmitted to line 102 and the memory cells in station delivery list store 110 identifying the addressee station have bits inserted therein to thereby list the stations of address.

At the conclusion of the message heading, the start-of-text code is transmitted. This is recognized by delivery unit 105 which terminates the selective energization of output leads HEADING. Transmission continues, however, whereby the subsequent message text is passed to encoder 106. Encoder 106, in turn, passes the data characters of the message text to the disassembler portion of assembler/disassembler 108 whereby the message is passed to data transmission line 102.

At each outlying station, such as outlying station 201, the incoming data characters are accepted by directional control 203 and then passed to clock and sampler 206. Upon the reception of each data character, clock and sampler 206 pulses output lead CLOCK, samples the data elements and passes the sampled data elements to character detector and generator store 208.

Recalling now that the first character of the message heading is the start-of-heading character, when this character is fully stored in character detector generator store 208, output lead SOH is pulsed. This pulse is passed to the input set terminal of flip-flop 209. Flip-flop 209 goes to the set condition whereby its output "1" terminal passes an enabling signal to AND gate 216. Line station 201 is now in condition to monitor the subsequent address or call-in codes transmitted during the message heading.

If line station 201 is not designated as an addressee station, the address or call-in code individual to the station is not transmitted and the message heading terminates with the start-of-text character. When the start-of-text character is fully stored in store 208, output lead STX is pulsed. This pulse is passed to the clear input of flip-flop 209. Flip-flop 209 is accordingly restored to the clear condition thus restoring line station 201 to its initial condition. The station thus retires until a new message heading is transmitted whereupon the station again looks for its call-in code.

If line station 201 is an addressee station, then the call-in code individual to the station will be received and accepted by store 208. This pulses output lead CIC. Since during the reception of the address codes AND gate 216 is enabled by memory set flip-flop 209, the pulse on lead CIC is passed through AND gate 216 to input lead SELECT of selection logic 210. Consequently, selection logic 210 goes to the "select" condition. At the end of the message heading, the start-of-text character is received and when the character is fully stored in store 208 output lead STX is pulsed, restoring flip-flop 209 to the clear condition. This removes the enabling condition from AND gate 216. However, inverter 218, which is also connected to output terminal "1" of flip-flop 209, provides an enabling condition at its output, which condition is passed to input lead START of selection logic 210. Since selection logic 210 is in the select state or condition, the enabling signal on input lead START transfers selection logic 210 to the print state or condition. In this condition, an enabling potential is passed to output lead UNBLIND. The enabling lead on output lead UNBLIND is passed to AND gate 217 permitting the AND gate to pass the output data from character detector generator and store 208 to input lead RECEIVE DATA of terminal set 214. Accordingly, terminal set 214 hereafter prints incoming data from line 102 which is passed by way of directional control 203, sampled by clock and sampler 206 and shifted through character detector generator and store 208. Thus the message text following the message heading is printed at line station 201.

The energizing potential applied to output lead UNBLIND is also passed to roll call logic 211. This places roll call logic 211 in the message print state. In this state roll call logic 211 monitors the clock pulses provided by clock and sampler 206 and the universal contact pulses provided by terminal set 214. Accordingly, roll call logic 211 will memorize a condition wherein a clock pulse is provided on input lead CLOCK without the corresponding provision of a contact pulse on input lead UC. It is seen that line station 201, as an addressee station, prints the message text and during the reception of the message text monitors the operation of the terminal set by checking pulses generated by the universal contacts against the production of clock pulses which occur in response to the reception of each data character by clock and sampler 206.

Returning now to master control station 101, the message text is concluded with the end-of-text character, which character is passed by way of encoder 106 and assembler/disassembler 108 to data transmission line 102. The end-of-text character is also detected by ETX detector 116. A pulse is thereby provided to input lead STOP of delivery unit 105. This stops the delivery of the message. In addition, ETX detector 116 pulses the set input of flip-flop 120 and pulses AND gate 130. The pulsing of flip-flop 120 places it in a set condition. In this condition, an enabling potential is applied to AND gates 125, 126, and 128.

Returning now to the enabling of AND gate 130, the roll call code presently applied to output lead CONTENTS of roll call unit 104 is passed to test station store 112. It is, of course, apparent that the same code is applied to the other input of comparator 114 to momentarily enable one input of AND gate 129. The other input to AND gate 129 is not enabled at this time, however.

Returning now to the state of flip-flop 120 and the enabling of AND gates 125, 126, and 128, with AND gates 125 and 126 enabled, output lead ON LIST of station list store 110 is monitored. At this time roll call unit 104 is at its first position corresponding to the first outlying station. Translator 115 is operated by the roll call code of this station on output lead CONTENTS of roll call unit 105. Thus the SELECTOR lead individual to the first outlying station is energized by translator 115. Accordingly, output lead ON LIST is energized in the event that the memory cell individual to the first outlying station has a bit stored therein, indicating that the message is destined for the first outlying station. Conversely, if the first outlying station is not a destination station, the output lead ON LIST is not energized.

Assume that the first outlying station is an addressee station and the memory cell in store 110 is set. Output lead ON LIST is therefore energized and the pulse produced thereby is passed through AND gate 126 to input lead SEND of roll call unit 104. Accordingly, the roll call code is passed to encoder 106 and then by way of assembler/disassembler 108 to data transmission line 102. Master control station 101 now awaits the response of the outlying station.

If the response comprises the code character indicating that the message was properly received, input code translator 109 pulses output lead ACK. This pulse is passed to input lead RESET of station delivery list store 110 to remove the bit in the memory cell. Concurrently, the pulse on output lead ACK passes through OR gate 135 and then through OR gate 136 to AND gate 125. The output pulse provided by AND gate 125 is applied to input lead STEP of roll call unit 104. This advances roll call unit 104 to the next position. The pulse is also applied to AND gate 128 passing the pulse in turn to input terminal set of flip-flop 121. Flip-flop 121 goes to the set condition providing an enabling condition by way of delay unit 140 to gate 129. The delay of delay unit 140, however, provides a sufficient interval to permit roll call unit 104 to step to the next position before gate 129 is enabled whereby a new roll call code is presented to lead CONTENTS and comparator 114 is no longer pulsing AND gate 129. Roll call unit 104 now generates the next roll call code and the sequence is repeated.

If the outlying station returns the data code character indicating that the message was not properly received, input code translator 109 pulses output lead NAK. This pulse is passed through OR gate 135 and OR gate 136 to AND gate 125. Accordingly, roll call unit is stepped, flip-flop 121 is set, and AND gate 129 is enabled by way of delay unit 140 in the same manner as previously described with respect to the reception of the code character indicating proper reception of the message. In this case, however, the memory cell is not cleared and the bit remains therein.

In the event that the first outlying station is not a station of address, the low condition on output lead ON LIST of station list store 110 is inverted by inverter 141, and the resultant high or enabling condition is passed through OR gate 136 to AND gate 125. Accordingly, roll call unit 104 is stepped to the next position, flip-flop 121 is set and AND gate 129 is enabled after the completion of the step by roll call unit 104. The memory cells of station list store 110 are thus sequentially scanned, the roll call codes of the outlying addressee stations are generated when the stations are on the list and the responses from the outlying stations are examined with the memory cell being cleared of the bit therein if the response indicates that the message was properly received.

At the several addressee outlying stations, the end-of-text character is passed to character detector generator and store 208 whereby output lead ETX is pulsed. This pulse is passed to the set input of flip-flop 209 restoring the flip-flop to the set condition whereby AND gate 216 is re-enabled. In addition, the pulse on lead ETX is passed to selection logic 210 switching it to the roll call state or condition. In this state output lead UNBLIND is deenergized whereby AND gate 217 is disabled, blinding the recorder in terminal set 214. The energizing potential applied to input lead UNBLIND of roll call logic 211 is also removed terminating the monitoring of the clock pulses and the universal contact pulses. Selection logic 210 also passes an energizing potential to output lead ENABLE. This is passed to roll call logic 211 whereby it goes to the roll call state or condition. Line station 201 now looks for the roll call code.

When the roll call code individual to line station 201 is received and passed to character detector generator and store 208, output lead CIC is pulsed since this roll call code is identical to the call-in code. This pulses AND gate 216 which passes a pulse to input lead SELECT of roll call logic 211. With roll call logic 211 in the roll call state, the pulsing of input lead SELECT functions to examine the memory of roll call 211 to determine whether or not a universal contact pulse was provided for each clock pulse. If a universal clock pulse was provided for each pulse, output lead ACK is pulsed. Alternately, if the message was not properly received, as evidenced by the failure of the universal contact in the teletypewriter to produce a pulse when a data character is received by clock and sampler 206, the output lead NAK is pulsed. At the same time, roll call logic 211 provides an enabling signal to input terminal SW of signal gate 205 thereby connecting the output of character detector generator and store 208 to directional control 203 and then to data transmission line 102. Accordingly, in response to the roll call code from master control station 101, line station 201 pulses input lead ACK of store 208 if the message was properly received or pulses output lead NAK if the message was not properly received. The appropriate data character is thus coded in the stages of store 208 and shifted out of store 208 through signal gate 205 and directional control 203 to data transmission line 102.

At master control station 101, the roll call code of each addressee station is generated as previously described. Roll call unit 104 thus proceeds to step around and then finally back to its initial position. At this position, the roll call code applied to output lead CONTENTS is identical with the roll call code stored in test station store 112. Comparator 114 thus detects identical codes and pulses gate 129. Gate 129 clears flip-flops 120 and 121, pulses AND gate 127 and pulses input lead RESTART of delivery unit 125. The clearing of flip-flop 120 disables gates 125, 126, and 128. The pulsing of AND gate 127 reads out the identity of memory cells still storing bits therein. This identifies the addressee stations which responded that the message was not properly received. These identities, of course, could be displayed or printed to permit manual handling of the message or retransmission of the message at a later time.

The pulsing of input lead RESTART of delivery unit 105 advances the scanning of the message tape. This final portion of the message tape generally includes "fill" characters terminated by the end-of-transmission character. This end-of-transmission character is detected by EOT detector 117 which passes a pulse to input lead RESET of delivery unit 105 and a pulse to input lead CLEAR of station list store 110. The memory cells in store 110 are thereby all cleared and delivery unit 105 is reset rendering it available to accept a new message. Master control station 101 is now available for the next message.

At the outlying address station such as line station 201, the end-of-transmission character is passed to character detector generator and store 208. This pulses output lead EOT. The pulse on lead EOT clears flip-flop 209 and pulses input lead EOT of selection logic 210. Selection logic 210 is now restored to its initial idle condition. This removes the condition on output lead ENABLE whereby roll call logic 211 is restored to its initial condition. Accordingly, line station 201 is restored to the initial condition, awaiting the message heading of the next message.

Although a specific embodiment of this invention has been shown and described, it will be understood that various modifications may be made without departing from the spirit of this invention.

What is claimed is:

1. In a multistation line receiver selection system for distributing data messages from a transmitter to station receivers connected to said line, said data messages having a heading portion including designating codes identifying the stations of address and having a text portion, each of said stations including means responsive to the reception of the designating code identifying the station for unblinding the receiver thereat and further including means responsive to the reception of a roll call code identifying the station for returning data indicating the condition of the receiver thereat characterized in that the system includes a master controller including means for examining each of said designating codes in said heading portion and listing the identity of the designated station and means enabled after the termination of the distribution of the text portion of the message for sequentially transmitting roll call codes identifying each of the listed designated stations.

2. In a multistation line receiver selection system in accordance with claim 1 wherein said master controller further includes means responsive to said data returned from each station for enabling said means for transmitting roll call codes to send the next roll call code in the sequence.

3. In a multistation line receiver selection system in accordance with claim 1 wherein said master controller further includes means selectively responsive to data returned from each station indicating a predetermined condition of the receiver for deleting the listing identifying the responding station.

4. In a multistation line receiver selection system in accordance with claim 3 wherein said master controller further includes means operated after all the addressee stations return the data in response to the roll call codes for reading the identity of each listed station whereby a record of the addressee stations not indicating said predetermined condition is provided.

References Cited

UNITED STATES PATENTS

| | | | |
|---|---|---|---|
| 2,912,485 | 11/1959 | Kaufman et al. | 178—4.1 |
| 2,979,556 | 4/1961 | Anspach et al. | 178—3 |
| 3,107,340 | 10/1963 | Silliman et al. | 340—163 |
| 3,134,848 | 5/1964 | Light et al. | 178—4 |
| 3,223,977 | 12/1965 | David et al. | 340—163 X |

EUGENE G. BOTZ, *Primary Examiner.*

U.S. Cl. X.R.

178—4.1; 340—163